(12) United States Patent
Honda et al.

(10) Patent No.: US 6,493,466 B1
(45) Date of Patent: Dec. 10, 2002

(54) IMAGE DATA COMPRESSION OR EXPANSION METHOD AND APPARATUS, AND IMAGE TRANSMISSION SYSTEM AND MONITORING SYSTEM USING THE METHOD AND DEVICE

(75) Inventors: Toyota Honda, Yokohama (JP); Masayoshi Kuroda, Yokohama (JP); Shinya Imanishi, Yokohama (JP); Koichi Takamoto, Okayama (JP); Yuichi Michikawa, Kasama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/289,937

(22) Filed: Apr. 13, 1999

(30) Foreign Application Priority Data

Apr. 13, 1998 (JP) ............................................ 10-101093

(51) Int. Cl.⁷ ................................................. G06K 9/36
(52) U.S. Cl. ...................................... 382/236; 382/234
(58) Field of Search ......................... 382/232, 233–236, 382/238, 244–246; 348/14.11, 14.12, 14.13, 14.14, 14.15, 384.1, 387.1, 390.1; 358/426.01, 426.02, 426.03

(56) References Cited

U.S. PATENT DOCUMENTS

| | | | |
|---|---|---|---|
| 5,212,742 A | * 5/1993 | Normile et al. | 382/234 |
| 5,543,939 A | * 8/1996 | Harvey et al. | 358/426 |
| 5,724,475 A | * 3/1998 | Kirsten | 386/109 |
| 6,088,392 A | * 7/2000 | Rosenberg | 375/240 |
| 6,160,846 A | * 12/2000 | Chiang et al. | 375/240.05 |
| 6,188,700 B1 | * 2/2001 | Kato et al. | 370/477 |

FOREIGN PATENT DOCUMENTS

| | | | |
|---|---|---|---|
| JP | 8223530 | 8/1996 | ............ H04N/5/92 |
| JP | 9168155 | 6/1997 | ............ H04N/7/32 |

OTHER PUBLICATIONS

H.261 "Method of the ITU–T" (International Telecommunication Union–Telecommunication Standardization Sector).

* cited by examiner

Primary Examiner—Andrew W. Johns
Assistant Examiner—Duy M. Dang
(74) Attorney, Agent, or Firm—Antonelli, Terry, Stout & Kraus, LLP

(57) ABSTRACT

Image data compression method and apparatus which improves image quality in a scene where image greatly changes and reduces the image data, and image transmission system and monitoring system using the method and apparatus. The image data compression apparatus which compresses input image data and outputs compressed image data comprises a detection unit which detects a motion or change of each scene, a determination unit which determines the detected motion amount or change amount, a switch circuit which controls a frame rate in accordance with the results of determination, and a compression encoding unit which compression-encodes the image data. The apparatus performs control such that an image having small motion amount and small change amount with respect to a predetermined image is not compression-encoded, so that the frame rate in a scene where the motion or change is large is higher than that in a scene where the motion and change are small.

6 Claims, 13 Drawing Sheets

IMAGE DATA COMPRESSION OR EXPANSION METHOD AND APPARATUS, AND IMAGE TRANSMISSION SYSTEM AND MONITORING SYSTEM USING THE METHOD AND DEVICE

CROSS-REFERENCE TO RELATED APPLICATION

This application is related to application Ser. No. 10/086,711 filed on Mar. 4, 2002, which is a division of the present application.

BACKGROUND OF THE INVENTION

The present invention relates to a novel image data compression or expansion method and apparatus, and more particularly, to an image transmission system and a monitoring system using the method and apparatus.

To transmit image data on a communication line or record the image data in a recording device, generally, the image data must be compressed by any means because the data amount of original image data is too large. As a representative image data compression method, the H.261 method of the ITU-T (International Telecommunication Union-Telecommunication Standardization Sector) standards has been known and is put into practical use.

This method compression-encodes an image signal to data of a low bit rate of several 10 to 100 kbps, to transmit the image data on a communication line, to realize a so-called picturephone. The method utilizes time sequential information compression by motion compensation and spatial information compression by DCT (Discrete Cosine Transformation).

Further, image data compression methods based on the JPEG, MPEG1 and the like are known. These methods perform image data compression processing so as to maintain a constant frame rate (the number of frames within a fixed period).

Generally, upon image data compression, if the content of image is fine (many high frequency components are included), or the motion of the image is fast, the image data cannot be greatly compressed. Accordingly, when image data is compression-encoded to data with several 10 to 100 kbps transmission speed by the above-mentioned H.261 method, generally, in a scene where the image is not so fine and the motion is slow, the frame rate (the number of frames within a fixed period) is raised (increased), on the other hand, in a scene where the image is fine and the motion is fast, the frame rate is lowered (reduced).

As the frame rate is low (the number of frames is small) in a scene where the image is fine and the motion is fast, the movement displayed on a display device of a transmission destination is intermittent and unnatural. Further, generally, upon control to increase the frame rate in the fast-motion scene, the image quality of the image itself is degraded.

In this manner, with regard to a scene with large data amount even if compressed, where the image is fine and the motion is fast, the image data compression processing by the above-described conventional art merely reduces the data transfer speed while degrading the image quality of the image itself, or merely obtains a constant frame rate. The point of improvement in image quality of such scene where the image is fine and the motion is fast has not been taken into consideration at all. That is, in the above conventional techniques cannot obtain an image with excellent image quality regarding a scene where the image is fine and the motion is fast.

SUMMARY OF THE INVENTION

Generally, in a remote monitoring system to monitor transmission of on-site image by using a telephone line, an image with large amount of motion or change is especially significant as an image of abnormal status such as somebody's intrusion or fire. Further, in such remote monitoring system, it is desired to compress and transfer even an image with large amount of motion or change with sufficient image quality. That is, in a scene where the motion is not fast and the amount of change is small, the frame rate can be low, but in a scene where the amount of change is large and the motion is fast, corresponding to an abnormal situation, it is necessary to control the transmission such that the frame rate is not reduced and sufficient image quality can be maintained.

However, as described above, in the conventional technique based on the H.261 method or the like, the frame rate is high in a scene where the motion is slow, which is not so significant for the monitoring system, while the frame rate is lowered or the image quality is degraded in a scene with fast motion, which is significant for the monitoring system.

For this reason, the present invention has its object to provide image data compression or expansion method and apparatus and image transmission system using the method and apparatus, which solve the problems in the conventional techniques, improve the image quality of a scene where the image greatly changes and the motion is fast, and reduce the entire image data.

Further, another object of the present invention is to apply the above-described present invention to a remote monitoring system, to provide an excellent remote monitoring system, in which the image quality is not degraded in a scene where the motion is fast, significant for the monitoring system.

According to the present invention, to attain the aforementioned objects, the motion and change are detected in each scene, and the frame rate (the number of frames within a fixed period) is controlled to be higher in a scene with large change or fast motion, than in a scene with small change and motion.

More specifically, the above objects are attained by providing an image data compression apparatus which compresses input image data and outputs compressed image data, comprising: compression processing means for compression-processing input image data; image change detection means for detecting a change on image based on the input image data; frame rate control means for controlling a frame rate of outputted compressed image data obtained by compression-processing image data; and means for controlling the frame rate of outputted compressed image data such that the frame rate in a scene where the image change is small is lower than the frame rate in a scene where the image change is large, in accordance with the situation of the change on image detected by the image change detection means.

Further, according to the present invention, in the image data compression apparatus, the image change detection means comprises change amount detection means for detecting a change amount between images in the input image data.

Further, according to the present invention, in the image data compression apparatus, the image change detection means comprises motion amount detection means for detecting a motion amount on image in the input image data.

Further, according to the present invention, in the image data compression apparatus, the change amount detection means comprises reference image storage means for storing predetermined image data as a reference image, and arithmetic processing means for performing predetermined arithmetic processing between the input image data and the image data stored in the reference image storage means.

Further, according to the present invention, in the image data compression apparatus, the arithmetic processing means is subtraction processing means for performing subtraction.

Further, according to the present invention, in the image data compression apparatus, the motion amount detection means comprises reference image storage means for storing predetermined image data as a reference image and motion vector detection means for detecting a motion vector of input image data with respect to the image data stored in the reference image storage means.

Further, according to the present invention, in the image data compression apparatus, the frame rate control means comprises switching control means for performing or not performing compression encoding on image data in one-frame units, and the frame rate control means does not perform compression encoding on image data with a small change amount or motion amount, by using the switching control means, in accordance with the result of detection by the change amount detection means or that by the motion amount detection means.

Further, according to the present invention, the image data compression apparatus further comprises synthesizing means for synthesizing information on the frame rate of the compressed image data, controlled by the frame rate control means, wherein the information on the frame rate is added to the compressed image data, and the compressed image data is outputted.

Further, according to the present invention, in the image data compression apparatus, the information on the frame rate is information on the number of frames thinned out for reducing the frame rate or information on time interval between thinned frames.

Further, according to the present invention, the image data compression apparatus further comprises recording means for recording input image at predetermined time intervals, wherein the image data compression is performed on the image recorded in the recording means.

Further, according to the present invention, the image data compression apparatus further comprises recording means for recording compression-encoded compressed image data, wherein the speed of outputting the compression-encoded imaged data is controlled by controlling reading from the recording means.

Further, according to the present invention, the above objects are attained by providing an image data expansion apparatus, which inputs and expands compressed image data outputted from the image data compression apparatus, comprising: decoding means for decoding compressed image data at a frame rate controlled to be lower in a scene where the change is small, than in a scene where the change is large; and expansion means for expanding the compressed image data decoded by the decoding means, wherein the input image data is reproduced such that the frame rate is lower in a scene where the change between images is small than the frame rate in a scene where the change between images is large.

Further, according to the present invention, the above objects are attained by providing an image data expansion apparatus, which inputs and expands compressed image data outputted from the image data compression apparatus, comprising: decoding means for decoding compressed image data at a frame rate controlled to be lower in a scene where the change is small than in a scene where the change is large; expansion means for expanding the compressed image data decoded by the decoding means, wherein the input image data being reproduced such that the frame rate is lower in a scene where the change between images is small than the frame rate in a scene where the change between images is large; and image interpolation means for generating an interpolation image from the input predetermined compressed image data, in accordance with the information on the frame rate outputted with the compression image data, wherein the reproduced input image data is interpolated with an interpolation image generated by interpolation processing by the image interpolation means, and the interpolated image data is outputted.

Further, according to the present invention, the above objects are attained by providing an image data compression method for compressing input image data and outputting compressed image data, comprising the steps of: detecting a change on image based on the input image data; controlling a frame rate of outputted compressed image data obtained by compression-processing image data such that the frame rate in a scene where the image change is small is lower than the frame rate in a scene where the image change is large, in accordance with the situation of the detected the change on image; and outputting the compression-processed image data.

Further, according to the present invention, in the image data compression method, detection of the change on image is made by detecting a change amount between images in the input image data.

Further, according to the present invention, in the image data compression method, detection of the change on image is made by detecting an motion change amount on image in the input image data.

Further, according to the present invention, in the image data compression method, detection of the change is made by arithmetic processing between images in the input image data.

Further, according to the present invention, in the image data compression method, detection of the change is made by detecting a motion vector of the input image data.

Further, according to the present invention, the image data compression method further comprises the step of synthesizing information on the controlled frame rate to the output compressed image data.

Further, according to the present invention, in the image data compression method, the information on the frame rate is information on the number of frames thinned out to reduce the frame rate or information on time interval between thinned frames.

Further, according to the present invention, the above objects are attained by providing an image data expansion method for inputting and expanding compressed image data, outputted by the image data compression method, comprising the steps of: decoding compressed image data, at the frame rate controlled to be lower in the scene where the image change is small than in the scene where the image change is large; and expanding the decoded compressed image data such that the frame rate in the scene where the change between images is small is lower than that in the scene where the change between images is large.

Further, according to the present invention, the above objects are attained by providing an image data expansion method for inputting and expanding compressed image data, outputted by the image data compression method, comprising the steps of: decoding the compressed image data at the frame rate controlled to be lower in the scene where the image change is small than in the scene where the image change is large; reproducing the input image data by expanding the decoded compressed image data such that the frame rate in the scene where the image change is small is lower than that in the scene where the image change is large; and generating an interpolation image from input predetermined compressed image data, in accordance with information on the frame rate, received with the compressed image data, and interpolating the reproduced input image with the generated interpolation image and outputting the interpolated image.

Further, according to the present invention, the above objects are attained by providing an image transmission system which performs image data communication by using an image data compression apparatus and an image data expansion apparatus, comprising: the image data compression apparatus, which compresses input image data and outputs compressed image data; transmission means for transmitting the compressed image data, outputted from the compression apparatus, on a predetermined line; reception means for receiving the compressed image data transmitted via the transmission means; and the image data expansion apparatus, which expands the compressed image data received by the reception means.

Further, according to the present invention, the above objects are attained by providing a monitoring system which performs image data communication by using an image data compression apparatus and an image data expansion apparatus, comprising: image data output means for obtaining an image of a monitoring object and outputting image data; the image data compression apparatus, which compresses input image data, from the image data output means, and outputs compressed image data; transfer means for transferring the compressed image data outputted from the image data compression apparatus; the image data expansion apparatus, which expands the compressed image data transferred via the transfer means; and a display device which displays the image data expanded by the image data expansion apparatus.

Further, according to the present invention, in the monitoring system, the transfer means comprises a communication line for transmitting image data.

Further, according to the present invention, in the monitoring system, the transfer means comprises a recording medium for recording image data.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Hereinbelow, preferred embodiments of the present invention will now be described in detail in accordance with the accompanying drawings.

Figure 1:
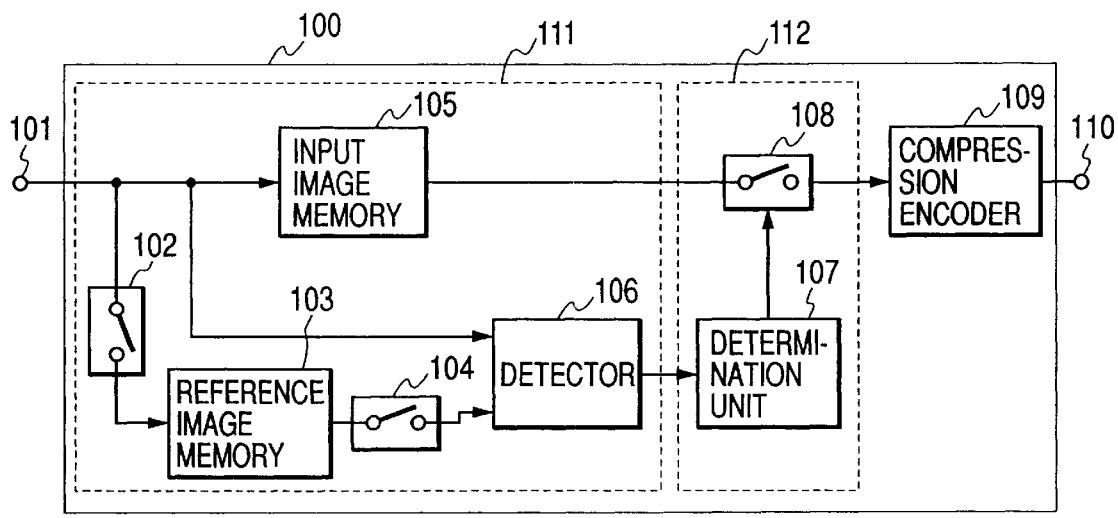
FIG. 1 is a block diagram showing an example of the construction of an image compression apparatus implementing an image compression method according to an embodiment of the present invention.

FIG. 1 is a block diagram showing an example of the construction of an image compression apparatus implementing an image compression method according to an embodiment of the present invention. In FIG. 1, reference numeral 100 denotes an image compression apparatus; 101, an input terminal for inputting digital image data; 102, a switch circuit; 103, a reference image memory for storing image data as a reference for at least one frame; 104, a switch circuit; 105, an input image memory for storing an input image for at least one frame; 106, a detector which compares an input image with a reference image and detects motion amount and change amount; 107, a determination unit which compares the motion amount and change amount detected by the detector 106 with predetermine values, and determines whether or not the input image is encoded or whether or not it is communicated; 108, a switch circuit; and 109, a compression encoder which compression-encodes image data. Note that the compression encoder 109 performs data compression by the JPEG or MPEG1 method, for example. Further, numeral 110 denotes an output terminal for outputting compressed image data. In FIG. 1, the switch circuit 102, the reference image memory 103, the switch circuit 104, the input image memory 105 and the detector 106 construct motion-amount and change amount detection means 111; and the determination unit 107 and the switch circuit 108 construct frame rate control means 112.

Prior to description of the operation in FIG. 1, the principle of image data compression of the present invention will be described with reference to the explanatory views of FIGS. 2 to 4.

Figure 2:
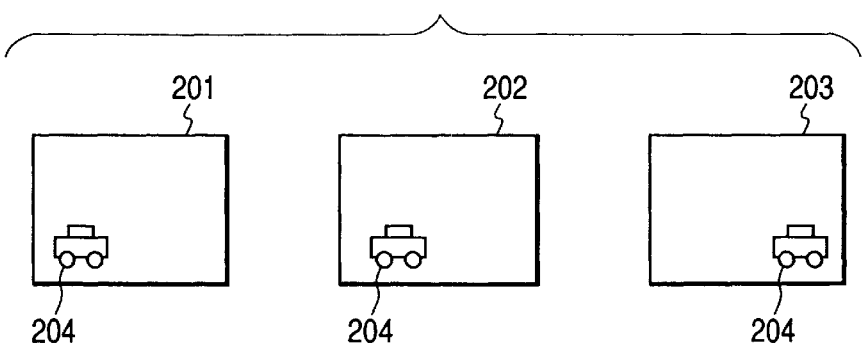
FIG. 2 is an explanatory view showing the principle of the image compression method of the present invention.

In FIG. 2, numerals 201 to 203 denote three images continuously obtained at predetermined time intervals (e.g., 1/30 sec. The time interval may be 1 sec., or may not be constant interval). In these images 201 to 203, numeral 204 denotes an object (a vehicle in FIG. 2) in each image.

In FIG. 2, when the image changes from 201 to 202, the object 204 almost does not move (it exists around a left end of the image), however, when the image changes from 202 to 203, the object 204 moves from the left end to the right end of the image. According to the image compression method of the present invention, when this image is transmitted, as the image 202 almost does not change (the change amount is small) with respect to the image 201, the image 202 is not compression-encoded and is not transmitted.

On the other hand, in the image 203, as the change (change amount) is larger in comparison with the image 201, the image 203 is compression-encoded and is transmitted. When the image 203 is transmitted, the image 203 itself may be compression-encoded and transmitted, otherwise, only a portion changed with respect to the image 201 may be transmitted or only the changed portion may be compression-encoded and transmitted. Note that it is significant that the image 202, with small change and motion with respect to the image 201, is not compression-encoded and is skipped (thinned out).

Figure 3:
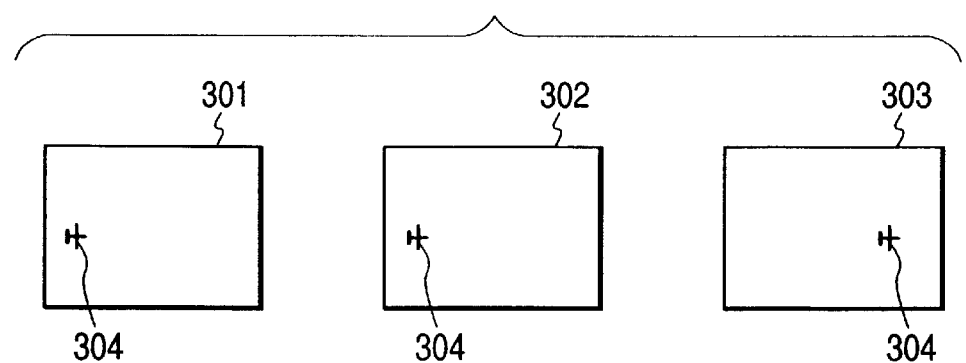
FIG. 3 is an explanatory view showing the principle of the image compression method of the present invention.

Next, FIG. 3 shows an example where an object moving in the image is small in comparison with the example in FIG. 2. In FIG. 3, numerals 301 to 303 denote continuously obtained three images similar to those in FIG. 2. Numeral 304 denotes an object (an airplane in FIG. 3) in each image.

In this example, similar to FIG. 2, when the image changes from 301 to 302, the object 304 almost does not move, however, when the image changes from 302 to 303, the object 304 moves greatly from the left end to the right end of the image. However, the object 304 (airplane) in the image in FIG. 3 is smaller than the object 204 (vehicle) in FIG. 2, and in comparison between the images 301 and 303, the change amount with respect to the entire image is not so large. In this case, the motion amount (i.e., the speed of motion) of the object 304 within a fixed period (it may be simply the interval between the respective images) is detected. By detecting the moving amount of the object on the image, although the change amount is small in comparison between the image 302 and the image 303, the motion amount is large (the motion is fast) in comparison between the image 301 and the image 303. In this case, the image compression method of the present invention does not compression-encodes nor transmits the image 302, but compression-encodes the images 301 and 303 and transmits these images. Note that when the image 303 is transmitted, a so-called motion vector of the object 304 may be transmitted. That is, the "change" here means the change amount between images and the motion amount on an image.

Figure 4:
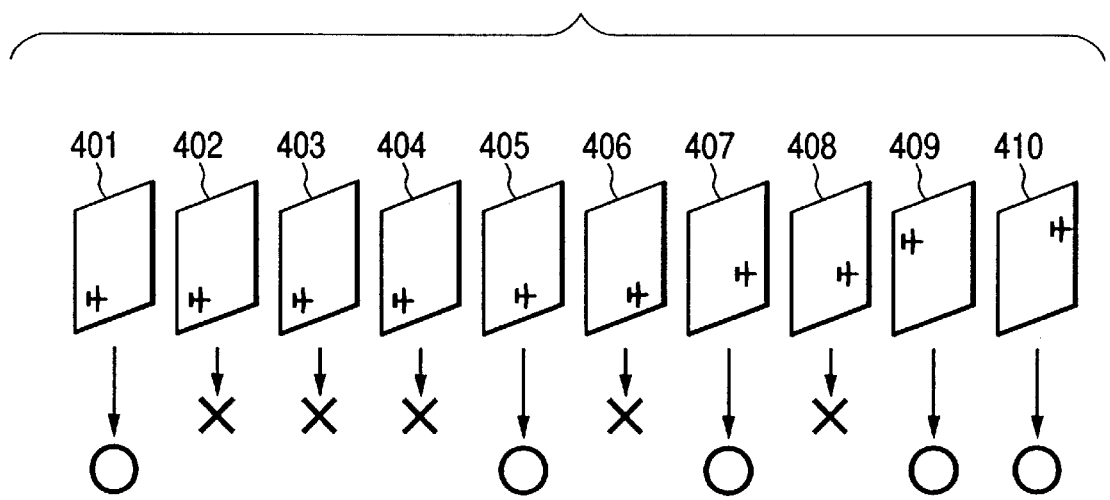
FIG. 4 is an explanatory view showing the principle of the image compression method of the present invention.

Further, FIG. 4 shows continuously obtained 10 images, similar to those in FIGS. 2 and 3. As it is apparent from this figure, the change amount is small from an image 401 to an image 405, then the change amount is large or the motion is fast from an image 406 to an image 410, especially, the motion from the image 409 to the image 410 is fast.

In case of compression encoding this image by the conventional H.261 method, for the purpose of comparison, in the image from 401 to 405 with the small motion amount, the images 401, 403 and 405 are compression-encoded, but in the image from 406 to 410 with the large motion amount, only the image 408 is compression-encoded. Accordingly, the frame rate of the outputted image signal is controlled to be high in the scene with small motion amount and lower in the scene with large motion amount.

On the other hand, in the present invention, as shown in FIG. 4 (i.e., "◯" represents compression encoding and "×" represents skipping (thinning out)), when the image 401 has been encoded, as there is almost no motion in images 402 to 404, these images are skipped (thinned out), and the image 405 is compression-encoded. Further, the images 406 and 408 are skipped (thinned out), and the images 407, 409 and 410 are encoded.

In this manner, in comparison with the case where 10 images are simply transmitted, a smaller number of images (5 in this case) are transmitted, accordingly, the transmission data amount can be reduced. Further, as the frame rate of the image with fast motion can be set to be high, when this image is decoding-expanded, omission of frame of significant image with motion or change can be prevented, rather, the significant image frames are increased. That is, in the image with fast motion, the motion or change can be treated in detail without degradation of image quality.

Figure 21:
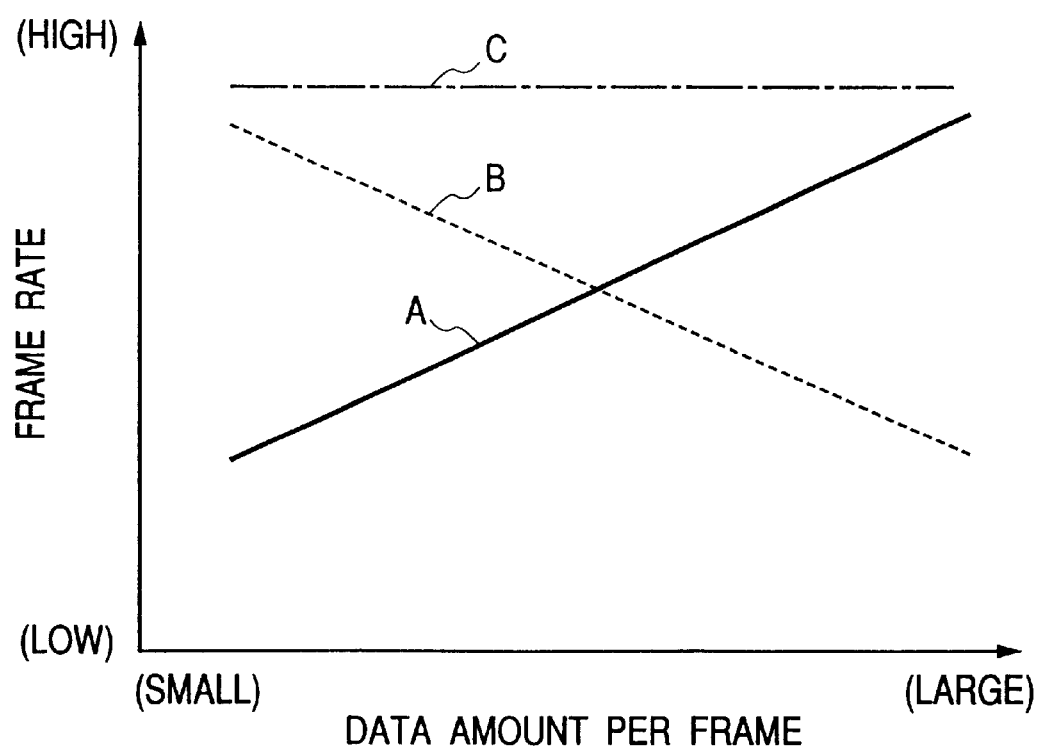
FIG. 21 is a graph showing the relation between data amount and frame rate of image data compression-encoded by the image compression method according to the present invention.

FIG. 21 is a graph showing the relation of data amount and the frame rate of image data compression-encoded by the image compression method according to the present invention. In the graph of FIG. 21, the horizontal axis represents the data amount per frame, and the vertical axis, the frame rate. A solid line A represents the relation between the amount and frame rate of image data compression-encoded by the image compression method according to the present invention. Further, for the purpose of comparison, a dashed line B represents the relation between image data and its frame rate obtained by the conventional technique (H.261 method), and an alternate long and short dashed line C represents the relation between image data amount and frame rate obtained by the other conventional technique MPEG1.

That is, as apparent from the graph of FIG. 21, as the change in image increases, the data amount of the compression-encoded image data, i.e., the data amount per frame increases. In the above conventional technique (H.261 method), the frame rate is reduced as represented by the dashed line B. In the relation between image data amount and frame rate obtained by the MPEG1, as the image quality of the compression-encoded image is degraded, the frame rate is controlled to be constant regardless of data amount of the image data, as represented by the alternate long and short dashed line C.

In the relation between data amount and frame rate of image data compression-encoded by the image compression method according to the present invention, as apparent from the solid line A, in an image with large motion amount or large change amount where the amount of compression-encoded image data increases, the frame rate is rather increased, while in an image with small motion amount and small change amount, the frame rate is reduced.

Next, the operation of the image compression apparatus 100, having the construction described with reference to FIG. 1, will be described based on the principle described with reference to FIGS. 2 to 4.

In the construction of FIG. 1, initially, the reference image memory 103 and the input image memory 105 are cleared, and the switch 102 is turned on, the switch 104 is turned off, and the switch 108 is turned off. First, when a first image is inputted into the input terminal 101, the image is stored into the reference image memory 103 and the input image memory 105. At this time, as the switch 104 is off, only the first image is inputted into the detector 106, and the entire image is regarded as a change portion. The determination unit 107 determines that the change amount is large, and the switch 108 is turned on.

As described above, when the first image has stored into the reference image memory 103 and the input image memory 105, the switch 102 is turned off, and the switch 104 is turned on. Then, when the second image is inputted into the input terminal 101, as the switch 102 is off, the image is not stored into the reference image memory 103, but stored into the input image memory 105, and inputted into the detector 106. Further, the first image stored in the input image memory 105 is inputted into the compression encoder 109 via the switch 108, and outputted to the output terminal 110. Further, the detector 106 compares the input second image with the first image stored in the reference image memory 103 via the switch 104, and detects change amount and motion amount.

The determination unit 107 compares the detected change amount and motion amount with predetermined values, and if it determines that the change amount and the motion amount are small, it turns the switch 108 off. In this case, the second image stored in the input image memory 105 is not sent to the compression encoder 109, and as it is not compression-encoded, it is not outputted to the output terminal 110. That is, the image frame is skipped. On the other hand, if the determination unit 107 determines that the change amount and motion amount are greater than the predetermined values, it turns the switch 108 on. Similar to the case of the first image, the compression encoder 109 compression-encodes the second image and outputs it to the output terminal 110. In this manner, by turning the switch 108 on/off in accordance with the change amount and/or the motion amount, the frame rate is controlled. Note that the image in the reference image memory 103 may be arbitrarily changed.

Figure 9:
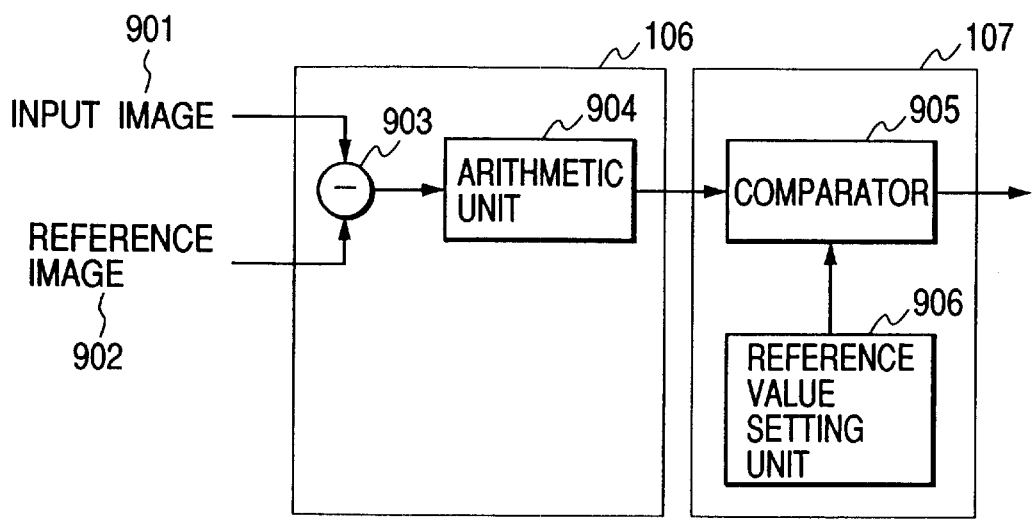
FIG. 9 is a block diagram showing an example of specific circuit constructions of change amount detector and determination unit of the image compression apparatus.

FIG. 9 is a block diagram showing an example of more specific circuit constructions of the detector 106 and the determination unit 107 in FIG. 1. That is, in FIG. 9, numeral 901 denotes an input image inputted from the input terminal 101; 902, a reference image stored in the reference image memory 103; and 903, a subtracter which obtains difference between the input image 901 and the reference image 902. The subtracter 903 calculates difference with respect to image data in pixel units. Further, numeral 904 denotes an arithmetic unit which performs predetermined calculation. The arithmetic unit 904 may obtain an average value of the entire image frame from the subtracter 903, for example. Otherwise, the arithmetic unit 904 may obtain a squared average value of the entire image frame from the subtracter 903, or may obtain the average value by any other calculation.

Further, numeral 905 denotes a comparator which determines the value obtained by the arithmetic unit 904; and 906, a reference value setting unit which sets a reference value for the comparator 905. For example, if the comparator 905 determines that the value from the arithmetic unit 904 is greater than the reference value set by the reference value setting unit 906, it determines that the change amount of the input image 901 is large.

Note that the embodiment as shown in FIG. 1 transmits only image data compression-processed from an input original image. However, the present invention is not limited to this arrangement. For example, as shown in FIG. 5, compressed image data, with additional information such as information on the number of skipped images and time interval, can be outputted.

Figure 5:
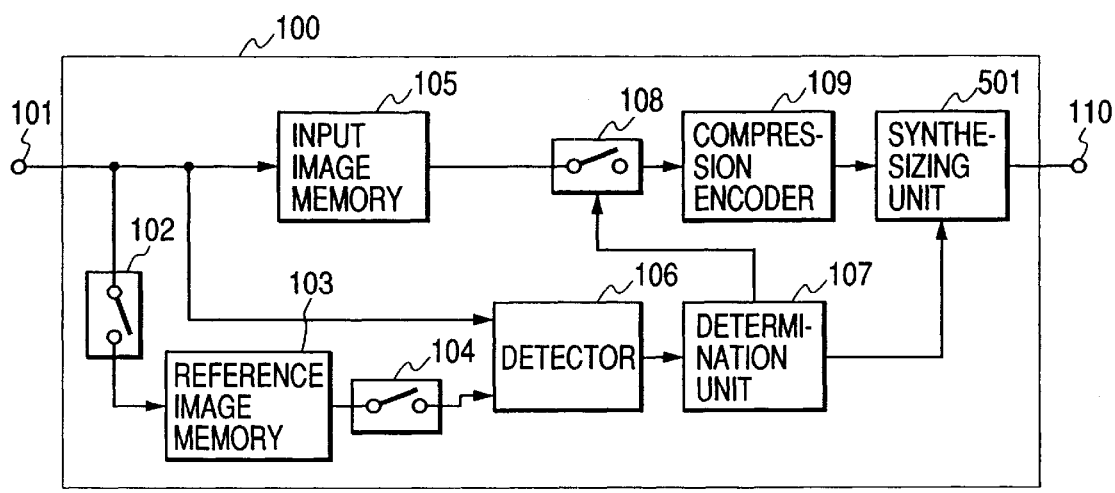
FIG. 5 is a block diagram showing another example of the construction of an image encoding apparatus realizing the image compression method according to another embodiment of the present invention.

Note that in FIG. 5, the elements corresponding to those in FIG. 1 have the same reference numerals, and the explanations of these elements will be omitted. In FIG. 5, numeral 501 denotes a synthesizing unit which synthesizes image data with additional information from the determination unit 107. Note that the additional information includes, e.g., information as to whether or not image data to be transmitted is reference image data, information on compression method, information on the number of skipped images, the time interval between the image data to be transmitted and previously transmitted image data, or the like. The synthesizing unit 501 synthesizes the additional information with the image data and outputs the data to the output terminal 110.

Next, an application of the image compression apparatus 100 according to the present invention will be described with reference to FIGS. 6 to 8.

Figure 6:
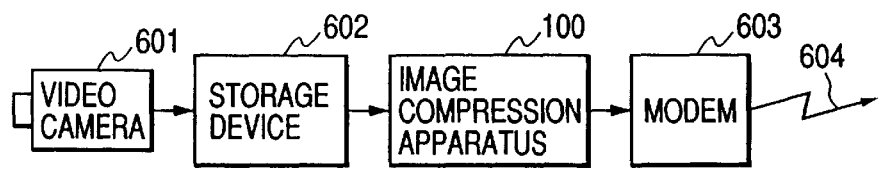
FIG. 6 is a block diagram showing the schematic construction of an application of the image compression apparatus according to the present invention.

FIG. 6 is a block diagram showing an example where the image compression apparatus 100 of the present invention is used in an image transmission system, applied to a remote monitoring system. In FIG. 6, numeral 601 denotes a video camera installed in a monitoring site. Note that the output from the video camera (original image) is inputted into a storage device 602. Thus, the image obtained by the video camera 601 is stored in one-second intervals. Note that the storage device 602 may comprise a semiconductor memory, or a video tape recorder, disk recorder or the like. Further, in FIG. 6, numeral 603 denotes a communication interface (modem) for communicating: image data compressed by the image compression apparatus 100 of the present invention on a communication line. Numeral 604 denotes a communication line.

Note in the above construction, the communication line 604 can be, e.g., an analog telephone line or a digital ISDN line. Especially, if the communication line 604 is an analog telephone line, the communication interface 603 comprises a modem or the like to perform signal modulation and demodulation.

Further, the output (original image) from the video camera 601 may be stored into the storage device 602, constantly at fixed time intervals. Otherwise, it may be arranged such that when an abnormality in monitoring (i.e., any motion on the image as the object of monitoring) is detected from the image obtained by the video camera 601, the image is stored. Further, it may be arranged such that a sensor or the like for abnormality detection (e.g., a sensor which detects smoke or fire in remote fire monitoring system) is provided in addition to the video camera 601, and when the sensor detects an abnormality, the image is stored.

In the remote monitoring system having the above construction, when an image stored in the storage device 602 as above is monitored in a remote place via the communication line 604, in case of compressing and transmitting the image stored in the storage device 602 by one frame, as in the conventional manner, if the communication line 604 is an analog telephone line, it takes much time to transmit the image because the communication speed is low. Further, as the storage device 602 merely holds images simply inputted at fixed time intervals, an image with almost no change, which is not necessary for monitoring, is also sent.

Generally, an image which needs monitoring in the monitoring system, i.e., an image especially significant for the purpose of monitoring, different from a normal monitoring image, has a change portion which may be an abnormality. According to the remote monitoring system having the image compression apparatus of the present invention, as shown in FIG. 6, the image compression apparatus extracts only an image (frame) with large change amount or large motion amount from images stored in the storage device 602, then compression-encodes only the extracted image (frame), and transmits it via the communication line 604. In other words, the image compression apparatus 100 performs compression encoding and transmission such that in a scene where the image changes greatly or the motion is fast, the frame rate (the number of frames transmitted within a fixed period) is not greatly reduced, while in a scene where the change amount and the motion amount are small, the frame rate is reduced greatly.

By this arrangement, as only an image (frame) necessary for monitoring is extracted from images stored in the storage device 602, the image quality of a motion-fast image is not degraded, and the entire image can be quickly transmitted via a communication line with low communication speed such as an analog telephone line, by reduction of image data amount. Note that if the communication speed of the communication line is not so high, as in this example, a storage device for storing compression-encoded image data may be provided at a previous stage of the communication interface, and data reading may be controlled for leveling the speed to output data onto the line.

Figure 7:
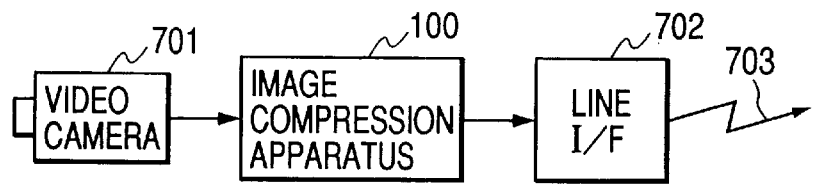
FIG. 7 is a block diagram showing the schematic construction of another application of the image compression apparatus according to the present invention.

FIG. 7 is a block diagram showing an another application where the image compression apparatus 100 of the present invention is used in an image transmission system using a LAN of the Ethernet or the like sufficiently fast for transmitting digital image data, or a high-speed communication line, and is applied to a remote monitoring system. Note that in FIG. 7, numeral 701 denotes a video camera; 702, a line interface; and 703, a communication line such as an Ethernet LAN or high-speed digital line.

In this case, the video camera 701 sends one image (one frame) in, e.g., 1/30 sec units, to the image compression apparatus 100. The image compression apparatus 100 performs compression encoding by the above-described method such that the frame rate (the number of frames within a fixed period) of a scene where the image greatly changes or the motion is fast is not greatly reduced, while the frame rate of a scene where the change amount and the motion amount are small is greatly reduced, and transmits the images via the line interface 702 on the communication line 703.

By this arrangement, the image quality of a motion-fast image is not degraded, and the entire image can be quickly transmitted, while the image data amount is reduced, even on a communication line with a low communication speed such as an analog telephone line. Further, as transmission is performed with emphasis on an image significant in monitoring, and the traffic (data transmission amount) on the communication line 703 can be reduced markedly in comparison with the conventional transmission, a larger number of cameras and the like can be connected to a communication line of the same capacity.

Figure 8:
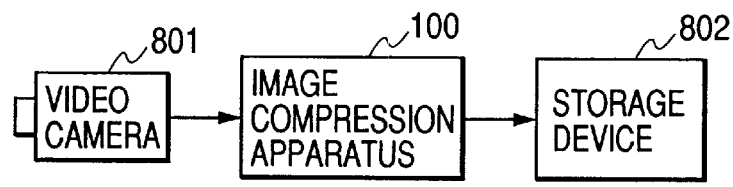
FIG. 8 is a block diagram showing the schematic construction of still another application of the image compression apparatus according to the present invention.

FIG. 8 is a block diagram showing another application where the image compression apparatus 100 of the present invention is applied to a monitoring system in which a monitoring image is not transmitted on a communication line as in FIGS. 6 and 7, but is stored in a video tape, a magnetic disk, an optical disk, a large capacity semiconductor memory or the like. In FIG. 8, numeral 801 denotes a video camera; 802, a large capacity recording device which may comprise a semiconductor memory, a video tape recorder, a hard disk device, a disk recorder or the like.

In the monitoring system of this example, similar to the above case, the image compression apparatus 100 of the present invention controls the frame rate to be high in a scene where the image greatly changes or the motion is fast. In other words, as only a frame with large change amount and a frame with fast motion are recorded, only significant frames for the purpose of monitoring can be recorded. Further, the image quality of motion-fast image is not degraded, and the entire image can be transmitted even on a communication line with a low communication speed such as an analog telephone line, while the image data amount is reduced. Accordingly, if a storage medium of the same capacity as that in the conventional recording is used in image recording, the recording can be performed for a period far longer than that in recording in the conventional recording.

In FIGS. 1 to 9, the apparatus realizing the image data compression method of the present invention and image transmission system and monitoring system using the apparatus have been described. Next, an embodiment of image expansion apparatus in relation to the above-described image compression apparatus will be described with reference to FIG. 10.

Figure 10:
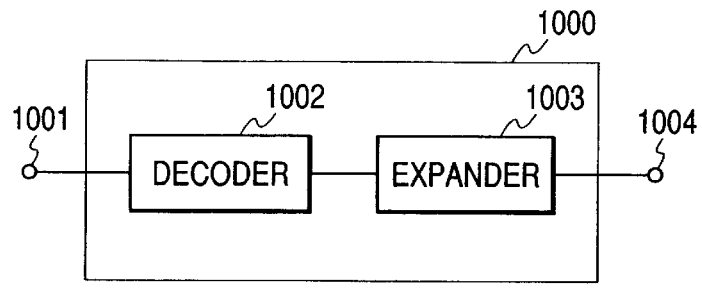
FIG. 10 is a block diagram showing a specific construction of an image expansion apparatus according to an embodiment in relation to the image compression apparatus in FIG. 1.

FIG. 10 shows an example of the construction of an image expansion apparatus in relation to the image compression apparatus in FIG. 1. In FIG. 10, numeral 1000 denotes an image expansion apparatus according to the present invention; 1001, an input terminal for inputting image data compression-encoded in accordance with the present invention; 1002, a decoder which decodes coded data; 1003, an expander which expands decoded compressed image data; and 1004, an output terminal for outputting expanded original image data (original image). Note that if the compression encoder 109 in FIG. 1 compresses image data by the JPEG method, the decoder 1002 decodes image data by Huffman decoding, then the expander 1003 performs inverse quantization or inverse DCT on the image data, to reproduce original image data.

That is, the image expansion apparatus performs decoding expansion on image data, transmitted such that the frame rate of an image where the motion is fast (motion amount is large) is high (the number of frames per a fixed period is large), while the frame rate of an image where the motion is slow (motion amount is small) is low (the number of frames per a fixed period is small). Accordingly, omission of significant image with motion or change can be prevented, rather, the number of such significant images is increased. That is, the motion or change can be treated in detail without degrading image quality of motion-fast image.

Figure 11:
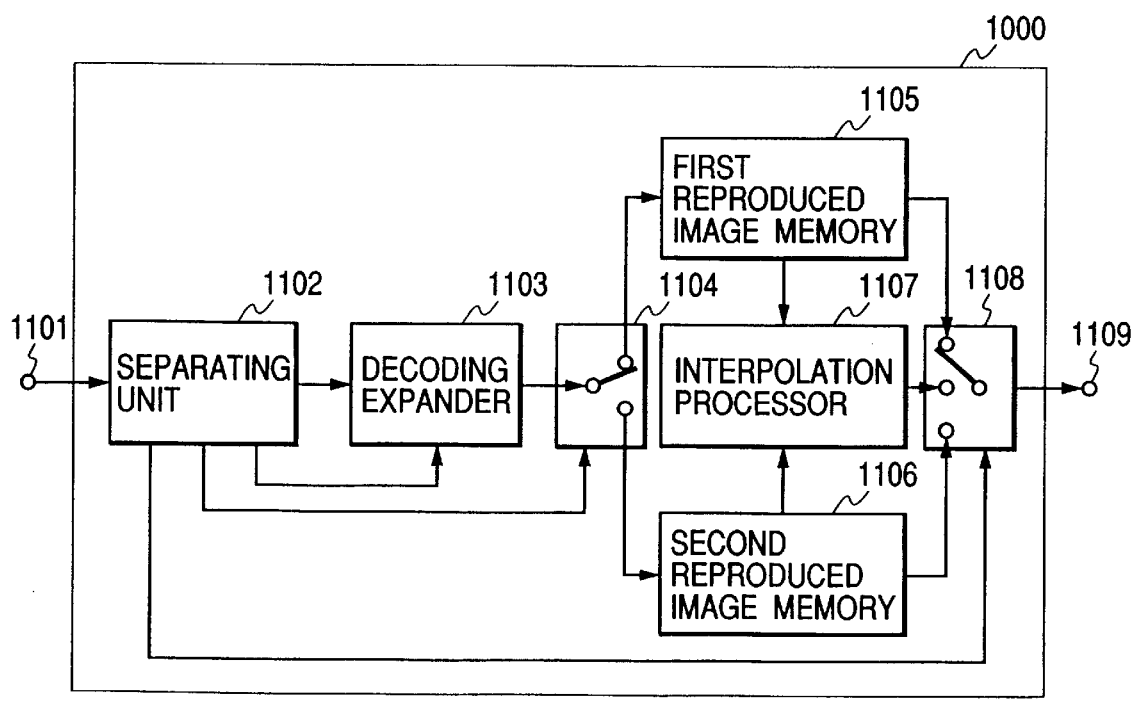
FIG. 11 is a block diagram showing the construction of the image expansion apparatus according to an embodiment in relation to the image compression apparatus in FIG. 5.

FIG. 11 is a block diagram showing the construction of the image expansion apparatus according to an embodiment, in relation to the image compression apparatus in FIG. 5. In FIG. 11, numeral 1101 denotes an input terminal; 1102, a separating unit which separates data into image data and additional information; 1103, decoding expander which decodes and expands compressed image data to reproduce original image data; 1104, a switch; 1105 and 1106, a first reproduced image memory and a second reproduced image memory for storing reproduced image data; 1107, an interpolation processor which performs interpolation processing based on the image stored in the first reproduced image memory 1105 and the image stored in the second reproduced image memory 1106 and obtains an interpolation image; 1108, a switch; and 1109, an output terminal.

In the image expansion apparatus, when image data compression-processed by the image compression apparatus shown in FIG. 5 and additional information are synthesized and inputted into the input terminal 1101, the separating unit 1102 separates the input data into the image data and the additional information, and the decoding expander 1103 reproduces original image data. In a case where the second image (frame) is skipped, and the first and third images are compression-processed and inputted, the first image is stored via the switch 1104 into the first reproduced image memory 1105, and the third image is stored via the switch 1104 into the second reproduced image memory 1106. Then, the interpolation processor 1107 performs interpolation processing based on the first and third images, to reproduce an image corresponding to the skipped second image, and outputs the images, via the switch 1108 switched for the respective images, to the output terminal 1109.

In this manner, although the image compression apparatus (100 in FIG. 5) can reduce the amount of transmission data by skipping an image (frame), the image expansion apparatus shown in FIG. 11 can reproduce the skipped image (frame) by interpolation processing and display the reproduced image. Accordingly, omission of image frame with motion or change can be prevented, and degradation of image quality of motion-fast image can be prevented. Further, even a motion-slow image frame can be reproduced by interpolation, and displayed at a normal frame rate, thus, the image quality of reproduced and displayed image can be improved, in used of data of the same transmission amount.

Figure 12:
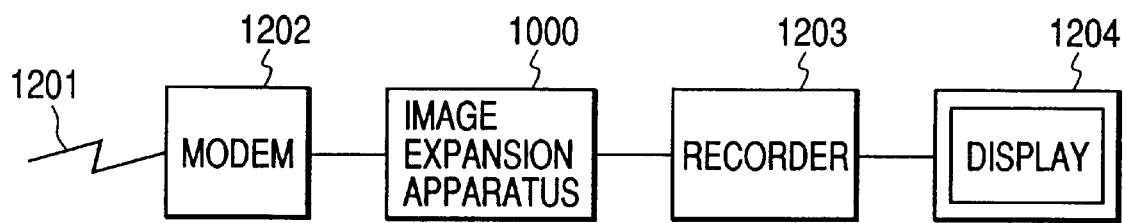
FIG. 12 is a block diagram showing an application of the image expansion apparatus in FIGS. 10 and 11.
Figure 13:
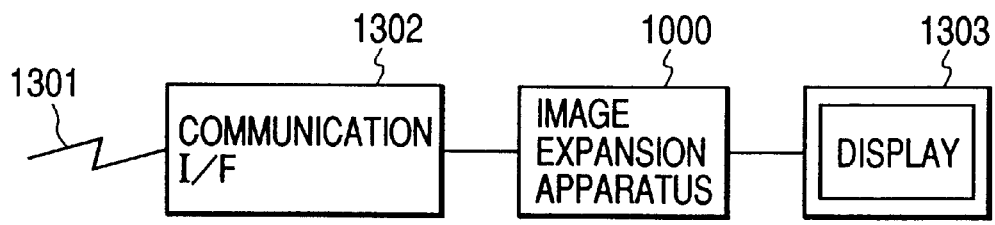
FIG. 13 is a block diagram showing another application of the image expansion apparatus in FIGS. 10 and 11.
Figure 14:
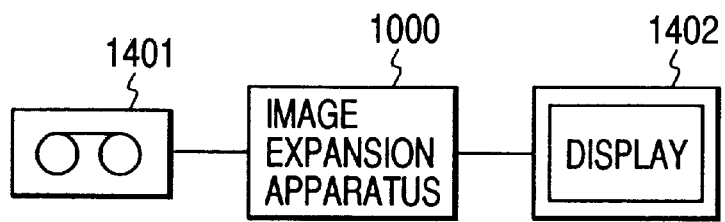
FIG. 14 is a block diagram showing still another application of the image expansion apparatus in FIGS. 10 and 11.

Further, FIGS. 12 to 14 show specific applications of the image expansion apparatus in FIGS. 10 and 11. Note that in FIGS. 12 to 14, numeral 1000 denotes the image expansion apparatus shown in FIG. 10 or FIG. 11.

First, FIG. 12 shows the image expansion apparatus in relation to the image compression apparatus FIG. 6. In FIG. 12, numeral 1201 denotes a telephone line; 1202, a modem; 1203, a recorder for recording an image; and 1204, a display such as a CRT, a plasma display or a liquid crystal display, for monitoring an image. As shown in FIG. 12, in a case where the telephone line 1201 is used as a image data transmission path, generally, the communication speed is low. However, as described above, by the operations of the image compression apparatus and the image expansion apparatus, an image can be transmitted at a high speed and can be displayed for monitoring, with image quality higher than that in conventional transmission.

FIG. 13 shows an example of the construction of the image expansion apparatus in relation to the image compression apparatus in FIG. 7. In FIG. 13, numeral 1301 denotes a high-speed communication line; 1302, a communication interface; and 1303, a display.

FIG. 14 shows an example of the construction of the image expansion apparatus in relation to the image compression apparatus in FIG. 8. In FIG. 14, numeral 1401 denotes a reproduction device such as a video tape recorder, a magnetic disk or an optical disk for reproducing an image recorded by the compression apparatus according to the present invention; and 1402, a display.

In the image expansion apparatus as shown in FIGS. 12 to 14, similar to the above example, omission of significant image frame with motion or change can be prevented, i.e., degradation of image quality in a motion-fast image can be prevented, and the motion or change of the image can be monitored in detail. Further, even a motion-slow image frame can be reproduced by interpolation and displayed at a normal frame rate. Accordingly, the image quality of reproduction-displayed image can be improved, in use of image data of the same transmission amount.

Figure 15:
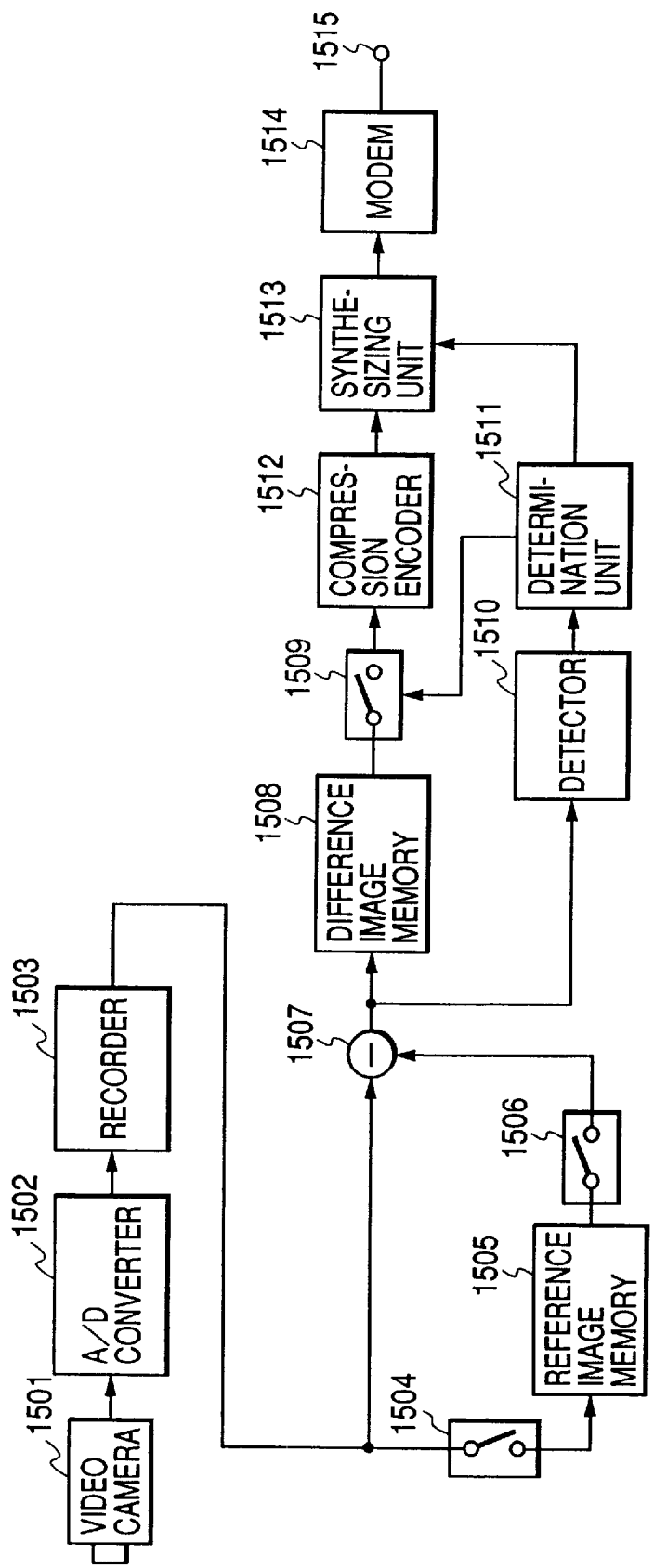
FIG. 15 is a block diagram showing the construction of the image compression apparatus according to another embodiment of the present invention.

Further, FIG. 15 is a block diagram showing the construction of the image compression apparatus according to another embodiment of the present invention. In the. embodiment in FIG. 15, the difference between a handled image with a reference image is obtained by subtraction processing to calculate a change amount, and an image with small change amount is not compression-processed and skipped. Additional information such as the number of skipped images or time is transmitted with the next image.

In FIG. 15, numeral 1501 denotes a video camera; 1502, an A/D converter which converts an image signal into a digital signal; 1503, a recorder for recording a plurality of images at fixed time intervals; 1504, a switch; 1505, a reference image memory for storing a reference image; 1506, a switch; 1507, a subtracter which performs subtraction processing; 1508, a difference image memory for storing a difference image processed by the subtracter 1507; 1509, a switch; 1510, a detector which detects a change amount of an image; 1511, a determination unit which determines the change amount from the result of detection by the detector 1510; and 1512, a compression encoder which performs predetermined image compression processing based on the JPEG or MPEG1 method. Further, numeral 1513 denotes a synthesizing unit which synthesizes compressed image data with additional information from the determination unit 1511 (e.g., information on the number of images which have been skipped without compression processing because the motions of these images are slow, time information on the interval between skipped images or the like); 1514, a modem which performs modulation and demodulation for communicating the synthesized data on a telephone line; and 1515, the telephone line.

In this system of the present embodiment, images obtained by the video camera 1501 are stored, e.g., at 1-second intervals, in the recorder 1503, constantly for several ten frames. When an abnormality is detected by a sensor (not shown) or by image recognition, the images recorded in the recorder 1503 are transmitted via the telephone line 1514. In the present embodiment, to transmit the images recorded in the recorder 1503, first, the switch 1504 is turned on, the switch 1506 is turned off, the switch 1509 is turned off, and the reference image memory 1505 and the difference image memory 1512 are cleared.

In this status, when the first image is outputted from the recorder 1503, it is stored into the reference image memory 1505. As the switch 1506 is off, there is no image data subtraction-processed by the subtracter 1507. Accordingly, the first image data is also stored into the difference image memory 1508. In this case, as the value of the entire image is treated as a difference value, the detector 1510 detects a large change amount. The determination unit 1511 determines that the change amount is very large, and turns the switch 1509 on.

Next, the switch 1504 is turned off while the switch 1506 is turned on, and the second image is read from the recorder 1503. At this time, as the switch 1509 is on, the compression encoder 1512 compresses the first image stored in the difference image memory 1508 in accordance with the JPEG method or the like, then the synthesizing unit 1513 synthesizes the compressed data with additional information, indicating that the compressed data is the reference image, from the determination unit 1511, and outputs the synthesized data via the modem 1514 onto the telephone line 1515. Regarding the second image, as the switch 1506 is on, the subtracter 1507 performs subtraction between the first image stored in the reference image memory 1505 and the second image, and stores the obtained difference image into the difference image memory 1508. If the second image does not have a large change amount in comparison with the first image, the detection value of the detector 1510 is not large, then the determination unit 1511 determines that there is no change, and turns the switch 1509 off. That is, the second image is not transmitted.

Next, if the third image has a large change amount in comparison with the first image, a difference image as the change amount is stored into the difference image memory 1508, then the detector 1501 and determination unit 1511 determine that the change amount is large, and the switch 1509 is turned on. The compression encoder 1512 compresses the difference images of the third and first images stored in the difference image memory 1508 by the JPEG method or the like, and the synthesizing unit 1513 synthesizes the images with additional information indicating that the second image has been skipped. Then, the synthesized data is transmitted via the modem 1514 onto the telephone line 1515.

Figure 16:
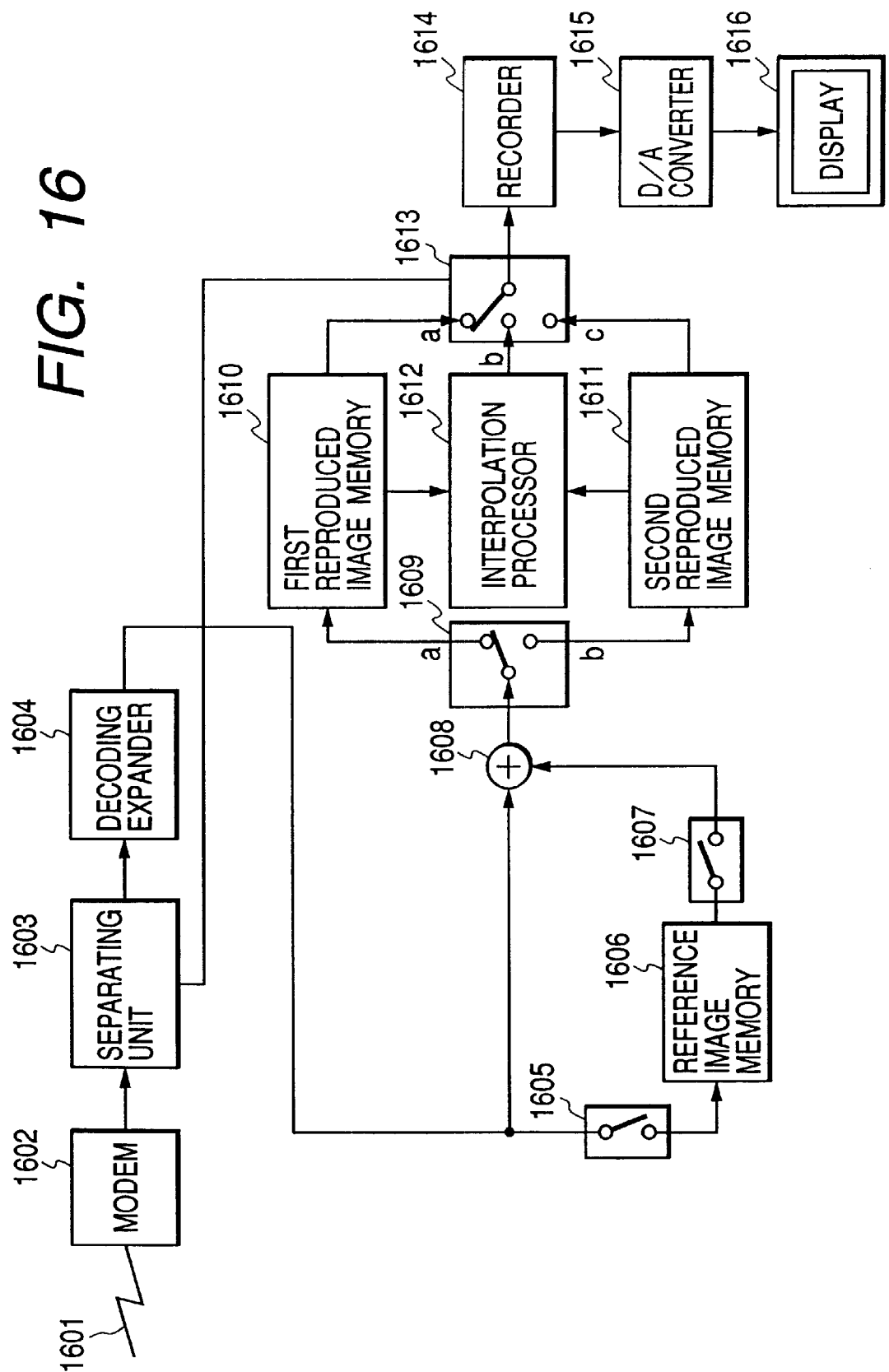
FIG. 16 is a block diagram showing the construction of the image expansion apparatus in relation to the image compression apparatus in FIG. 15.

FIG. 16 is a block diagram showing the construction of the image expansion apparatus in relation to the image compression apparatus in FIG. 15. In FIG. 16, numeral 1601 denotes a telephone line; 1602, a modem for signal modulation/demodulation; 1603, a separating unit which separates data into image data and additional information; 1604, a decoding expander which decoding-expands compression-encoded image data; 1605, a switch; 1606, a reference image memory; 1607, a switch; 1608, an adder; 1609, a switch; 1610 and 1611, first reproduced image memory and second reproduced image memory for storing reproduced images; 1612, an interpolation processor which performs image interpolation processing; 1613, a switch; 1614, a recorder for recording an image; 1615; a D/A converter which converts image data into an analog signal; and 1616, a display for monitoring an image.

In the image expansion apparatus having the above construction, the modem 1602 demodulates data sent from the telephone line 1601, then the separating unit 1603 separates the data into compressed image data and additional information. The decoding expander 1604 reproduces original image data from the compressed image data. If the sent image data is a reference image, the switch 1605 is turned on, the switch 1607 is turned off, and the switches 1609 and 1613 are connected to a-side. The reproduced image data is stored into the reference image memory 1606 and the first reproduced image memory 1610, then recorded in the recorder 1614, and displayed, via the D/A converter 1615, on the display 1616.

Similar to the description of FIG. 15, in this image expansion apparatus, if the second image is skipped and the difference image of the third image is received with additional information, the separating unit 1603 separates the data into image data and the additional information. Then the decoding expander 1604 reproduces an original difference image from the compressed difference image data. When the difference image data is sent, the switch 1605 is turned off, the switch 1607 is turned on, the switch 1609 is connected to b-side, and the switch 1613 is connected to b- or c-side in accordance with necessity. The adder 1608 adds the difference image, reproduced by the decoding expander 1604, to the reference image stored in the reference image memory 1606, so as to reproduce the third image, and stores the third image into the second reproduced image memory 1611. To display only an image with large change amount, the switch 1613 is connected to the c-side. The skipped second image can be reproduced from interpolation processing by the interpolation processor 1612 based on the first image, reproduced and stored in the first reproduced image memory 1610, and the third image, stored in the second reproduced image memory 1611. When this second image is displayed, the switch 1613 is connected to the b-side.

Figure 17:
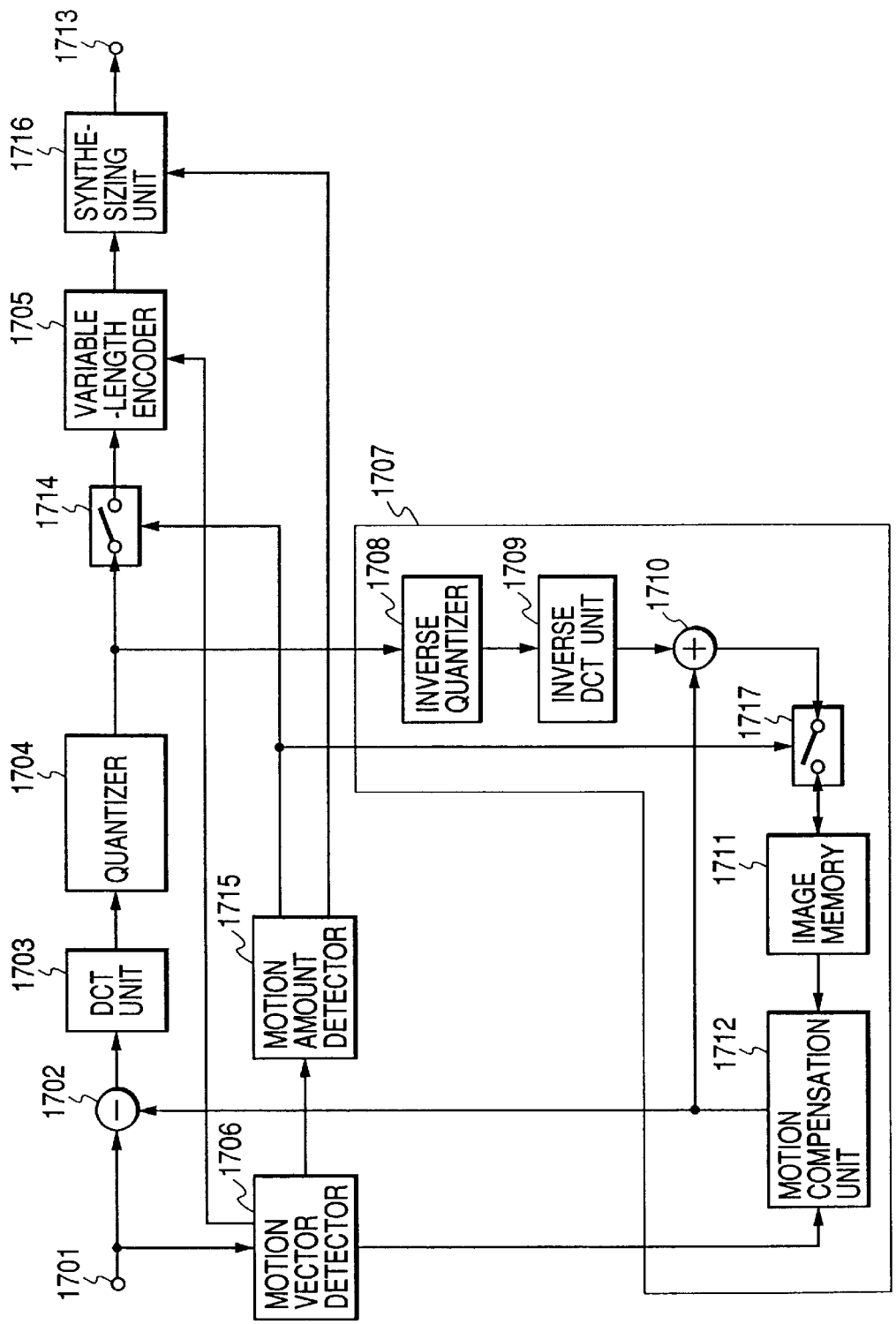
FIG. 17 is a block diagram showing the construction of the image compression apparatus according to still another embodiment of the present invention.

FIG. 17 is a block diagram showing another example of the construction of the image compression apparatus, based on the MPEG 1 method, according to the present invention. In FIG. 17, numeral 1701 denotes an input terminal for inputting image data; 1702, a subtracter; 1703, a DCT (Discrete Cosine Transformation) unit; 1704, a quantizer; 1705; a variable-length encoder; 1706, a motion vector detector; 1707, a local decoder; 1708, an inverse quantizer; 1709, an inverse DCT unit; 1710, an adder; 1711, an image memory; 1712, motion compensation unit; 1713, an output terminal; 1714, a switch; 1715, a motion amount detector; 1716, a synthesizing unit; and 1717, a switch. Note that among these constituents, the elements denoted by references 1701 to 1713 correspond to those in the image compression apparatus based on the MPEG 1 method.

In this construction, initially, the image memory 1711 is cleared. When the first image data is inputted into the input terminal 1701, as there is no data directed to subtraction in the subtracter 1702, the DCT unit 1703 performs DCT transformation on the input data, and the quantizer 1704 quantizes the data. The quantized data is forwarded to the switch 1714 and the local decoder 1707. As the switches 1714 and 1717 are initially turned on, the variable-length encoder 1705 variable-length encodes the data, and outputs the encoded data, via the synthesizing unit 1716, to the output terminal 1713. In the local decoder 1707, first, the inverse quantizer 1708 performs inverse quantization on the input data, then the inverse DCT unit 1709 performs inverse DCT transformation on the data, to restore the initial first image, and stores the image into the image memory 1711. When the second image data is inputted into the input terminal 1701, the motion vector detector 1706 detects a motion vector with respect to the first image.

The motion compensation unit 1712 performs motion compensation on the image in the image memory 1711 in accordance with the detected motion vector. Then the subtracter 1702 performs subtraction between the image data and the second image data. That is, the difference between the second image and the image obtained from motion compensation on the first image (schematic second image) is obtained, as a difference image. The DCT unit 1703 performs DCT transformation on the difference image, similarly to the first image, then the quantizer 1704 quantizes the difference image, and sends the image to the switch 1714 and the local decoder 1707. At this time, the motion amount detector 1715 compares the motion vector value (if the vector value is large, the motion is fast) detected by the motion vector detector 1706 with a predetermined value. If the vector value is less than the predetermined value, the motion amount detector 1715 determines that the motion is slow, and turns the switches 1714 and 1717 off so as not to encode the image data and skip the data.

As the switch 1717 is off, the image in the image memory 1711 is not updated. If the vector value is greater than the predetermined value, the motion amount detector 1715 determines that the motion is fast, and turns the switches 1714 and 1717 on. The variable-length encoder 1705 variable-length encodes the image data with the motion vector value. The synthesizing unit 1716 synthesizes the variable-length coded data with information indicating that the image is not skipped, and outputs the synthesized data to the output terminal 1713. Note that in the local decoder 1707, similarly to the first image, inverse quantization and inverse DCT transformation are performed on the difference image, and an image added by the adder 1710 to the image motion-compensated by the motion compensation unit 1712 (i.e., the second image) is stored in the image memory 1711.

When the third image data is inputted into the input terminal 1701, the motion vector detector 1706 detects, in a case where the second image has been skipped, a motion vector with respect to the first image, and in a case where the second image has not been skipped, a motion vector with respect to the second image. The motion compensation unit 1712 performs motion compensation on the image in the image memory 1711 based on the motion vector, and the subtracter 1702 performs subtraction between the motion-compensated image data and the third image, to obtain a difference image. The DCT unit 1703 performs DCT transformation on the difference image, then the quantizer 1704 quantizes the image and sends the image to the switch 1714 and the local decoder 1707. At this time, the motion amount detector 1715 compares the vector value (if the vector value is large, the motion is fast) detected by the motion vector detector 1706 with the predetermined value. If the vector value is less than the predetermined value, the motion amount detector 1715 determines that the motion is slow, and turns the switches 1714 and 1717 off, not to perform encoding and skip the image data again.

Further, as the switch 1717 is off, the image in the image memory 1711 is not updated. If the vector value is greater than the predetermined value, the motion amount detector 1715 determines that the motion is fast, and turns the switches 1714 and 1717 on. The variable-length encoder 1705 variable-length encodes the image with the motion vector value. The synthesizing unit 1716 synthesizes the variable-length coded data with information indicating that the image has not been skipped, and if the previous image has been skipped, with information indicating that the previous image has been skipped, and outputs the synthesized data to the output terminal 1713. Further, information on time interval between the previously-sent image and the current image (e.g., information indicative of $1/30$ sec if the previous image has not been skipped, while indicative of $2/30$ sec if the image has been skipped) may be sent in place of the information indicating that the image has been skipped/has not been skipped. Note that in the local decoder 1707, similarly to the previous image, inverse quantization and inverse DCT transformation are performed on the difference image, and if an image added by the adder 1710 to the image motion-compensated by the motion compensation unit 1712 (i.e., the third image) is not skipped, the image is stored into the image memory 1711.

Figure 18:
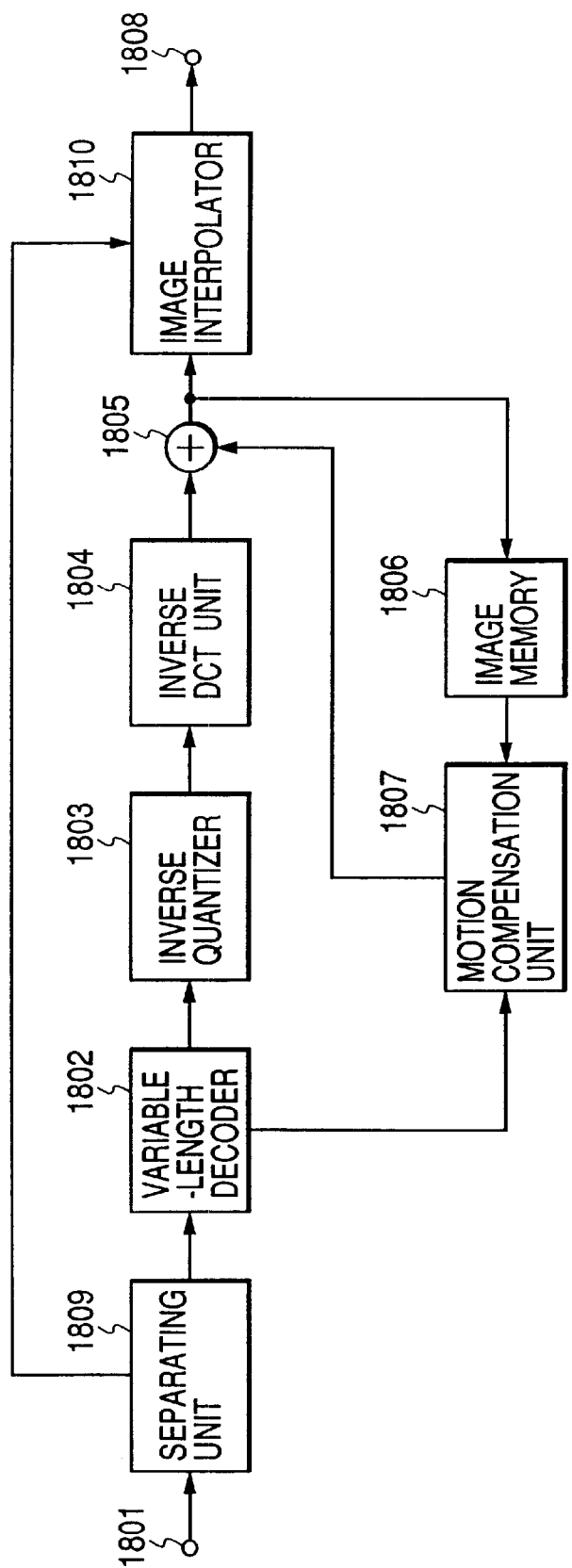
FIG. 18 is a block diagram showing the construction of the image expansion apparatus in relation to the image compression apparatus in FIG. 17.

FIG. 18 is a block diagram showing the construction of the image expansion apparatus based on the MPEG 1 method, in relation to the image compression apparatus in FIG. 17. In FIG. 18, numeral 1801 denotes an input terminal; 1802, a variable-length decoder; 1803, an inverse quantizer; 1804, an inverse DCT unit; 1805, an adder; 1806, an image memory; 1807, a motion compensation unit; 1808, an output terminal; an output terminal; 1809, a separating unit; and 1810, an image interpolator. Note that in FIG. 18, the elements denote by references 1802 to 1807 correspond to those in the image expansion apparatus based on the MPEG 1 method.

In the image expansion apparatus, when data compression-encoded by the image compression apparatus in FIG. 17 is inputted into the input terminal 1801, the separating unit 1809 separates the data into image data and other information. The variable-length decoder 1802 decodes the separated compressed image data, then the inverse quantizer 1803 performs inverse quantization on the image data and the inverse DCT unit 1804 performs inverse DCT transformation on the image data.

Note that as the image memory 1806 is initially cleared, the first image data passes through the image interpolator 1810 and enters the output terminal 1808. If the second image is skipped and the third image is inputted into the input terminal 1801, the separating unit 1809 separates the data into image data and information indicating that one image has been skipped, and sends the image data to the variable-length decoder 1802.

The variable-length decoder 1802 further separates the image data into a motion vector and difference image data. The inverse quantizer 1803 and the inverse DCT unit 1804 reproduce an original difference image from the difference image data. The motion compensation unit 1807 performs motion compensation on the first image in the image memory 1806 in accordance with the motion vector from the variable-length decoder 1802. The adder 1805 adds the motion-compensated image to the difference image, to reproduce the third image. The third image is stored into the image memory 1806, and at the same time, is sent to the image interpolator 1810. The image interpolator 1810 generates the second image by interpolation from the first and third images, if necessary, then outputs the second image to the output terminal 1808, and then outputs the third image to the output terminal 1808. The image interpolator 1810 may generate one or more images by interpolation in accordance with information on skipped image.

Figure 19:
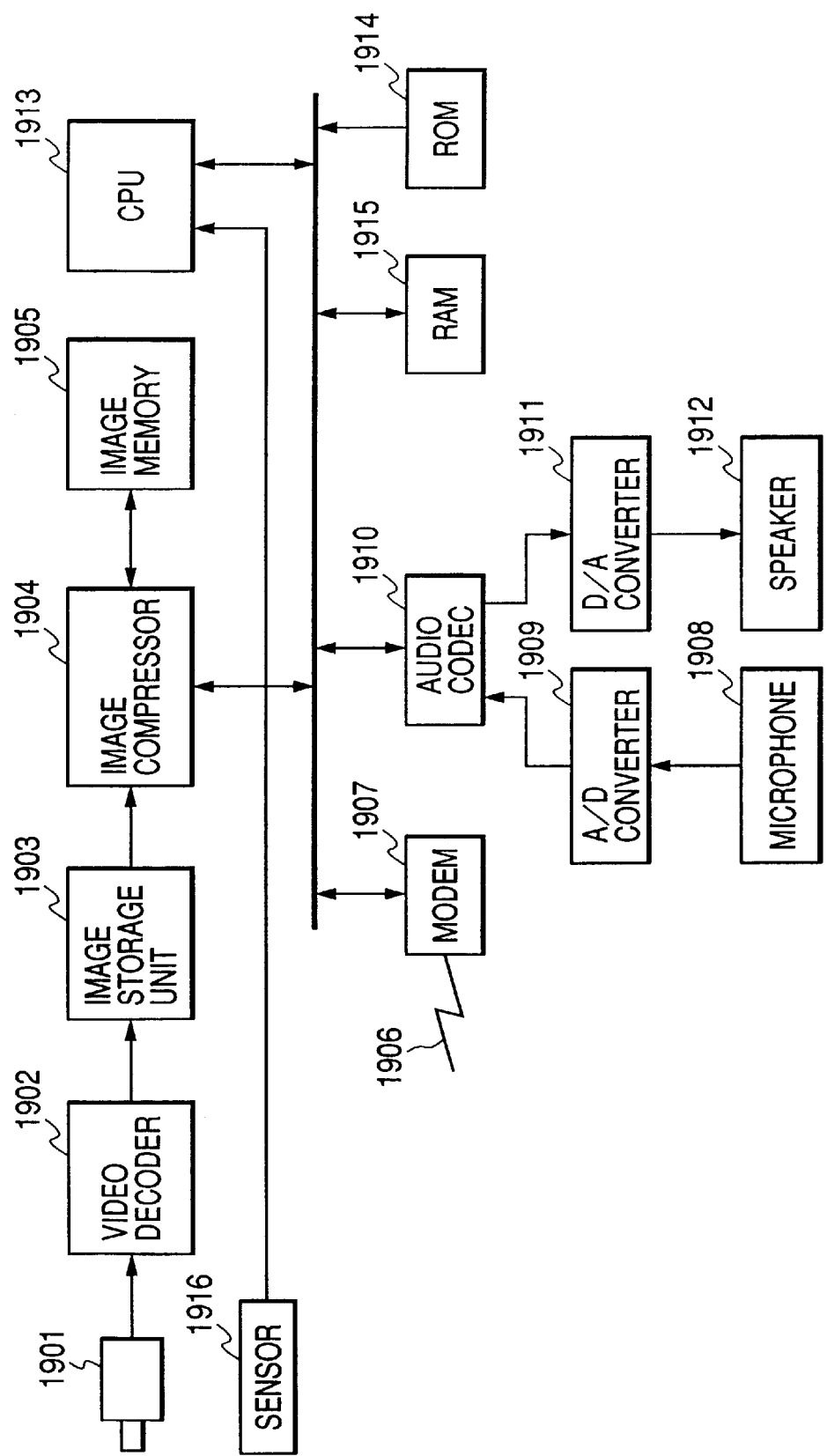
FIG. 19 is a block diagram showing the construction of a remote monitoring system using the image compression apparatus and the image expansion apparatus according to the present invention.
Figure 20:
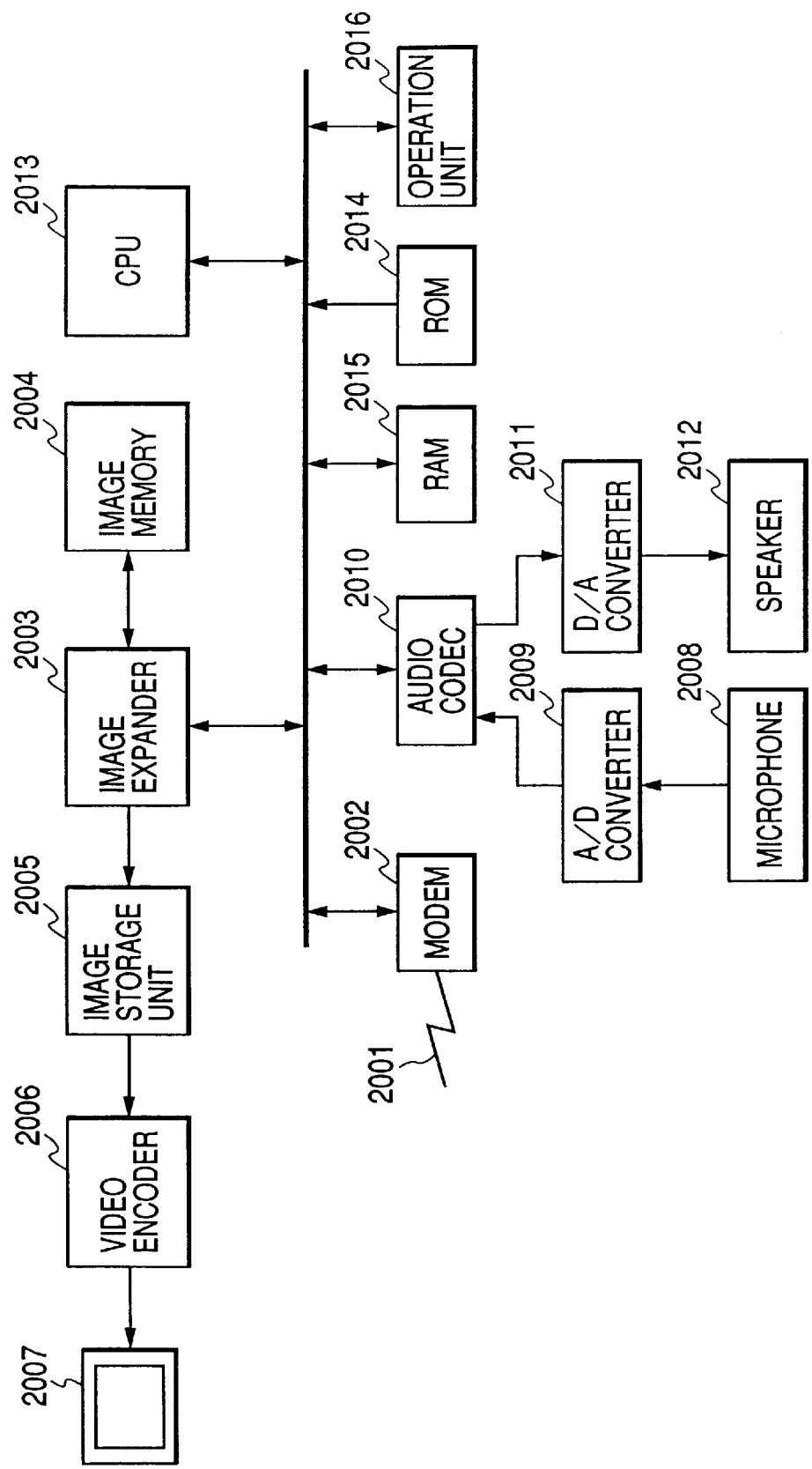
FIG. 20 is a block diagram showing another example of the remote monitoring system using the image compression apparatus and the image expansion apparatus according to the present invention.

FIGS. 19 and 20 are block diagrams showing a remote monitoring system to which the present invention is applied, for monitoring a remote place by using a telephone line. FIG. 19 shows the construction of a terminal side which obtains an image of monitoring object and transmits the image. FIG. 20 shows the construction of a center side which displays the image, sent from the terminal side, on a monitor.

In FIG. 19, numeral 1901 denotes a video camera which performs image pickup; 1902, a video decoder which converts an image signal from the video camera into digital image data; 1903, an image storage unit for temporarily storing the image; 1904, an image compressor according to the present invention which compression-encodes image data. Further, in FIG. 19, numeral 1905 denotes an image memory used by the image compressor or the like; 1906, a telephone line for transmission; 1907, a modem for communication on the telephone line; 1908, a microphone to collect sound; 1909, an A/D converter which converts an audio signal into digital audio data; 1910, an audio codec which compression-encodes or decoding-expands audio data; 1911, a D/A converter which converts audio data into an analog audio signal; and 1912, a speaker. Further, numeral 1913 denotes a central processing unit (CPU) for overall control, comprising a so-called microcomputer or the like, on the terminal side according to this example. Further, numeral 1914 denotes a ROM (Read Only Memory) for storing a processing program for the CPU 1913 or the like; 1915, a RAM (Random Access Memory) used as a work area or various buffers; and 1916, a sensor which detects an abnormality such as somebody's intrusion.

Further, in FIG. 20, numeral 2001 denotes a telephone line; 2002, a modem; and 2003, an image expander according to the present invention, which decoding-expands compressed image data. Numeral 2004 denotes an image memory used by the image expander or the like; 2005, an image storage unit for temporarily storing expanded image data; 2006, a video encoder which converts image data into an analog image signal; 2007, a display which displays a received image; 2008, a microphone; 2009, an A/D converter which converts an audio signal into digital audio data; 2010, an audio codec which compression-encodes or decoding-expands audio data; 2011, a D/A converter which converts audio data into an analog audio signal; 2012, a speaker; 2013, a central processing unit (CPU) for overall control, comprising a so-called microcomputer or the like. Further, numeral 2014 denotes a ROM (Read Only Memory) for storing a processing program for the CPU 2013; 2015, a RAM (Random Access Memory) used as a work area or various buffers; and 2016, an operation unit for overall operation.

In the above construction, on the transmission side in FIG. 19, when the sensor 1916 detects an abnormality, a predetermined number of images are obtained by the video camera 1901 at fixed time intervals (e.g., 1 sec or 0.2 sec) and stored into the image storage unit 1903. Then, the modem 1907 is used to start communication, via the telephone line 1906, with the center machine as shown in FIG. 20.

On the other hand, the images stored in the image storage unit 1903 are compression-encoded by the method as shown in FIGS. 15 and 17, and transmitted to the center machine. At this time, audio information from the microphone 1908 may be compression-encoded by the audio codec 1910, and transmitted with the image data in a time sequential manner. Further, it may be arranged such that the modem 1907 receives audio data (e.g., a voice threatening an intruder) sent from the center machine in FIG. 20, then the audio codec 1910 decode-expands the received data, and the speaker 1912 outputs the data.

Then, in the center machine in FIG. 20, the modem 2002 receives the image data via the telephone line 2001. The image expander 2003 decoding-expands the received image data by the method according to the present invention as described in FIGS. 11 and 18, stores the data into the image storage unit 2005, and at the same time, displays, via the video encoder 2006, on the display 2007. Note that at this time, received images may be sequentially displayed, or the display screen of the display may be divided into N screens and images are displayed on the N screens simultaneously. Further, similarly, the audio codec 2010 decoding-expands received audio data and the speaker 2012 outputs the audio data. Accordingly, if an operator watching the image and listening to the sound utters words of warning toward the microphone 2008, the operator's voice is compression-encoded by the codec 2003, and sent to the terminal machine as shown in FIG. 19. Note that at the operation unit 2016, to instruct the way of display on the display 2007 or to monitor the terminal machine side, start of communication can be instructed.

Various embodiments of the present invention have been explained as above. According to the present invention, the frame rate can be controlled such that an image (frame) with a small change amount and motion amount with respect to a predetermined reference image (it may be arbitrarily changed) is skipped (not compression-encoded nor transmitted), while an image with a large change amount or motion amount is compression-encoded and transmitted while avoiding skipping as much as possible.

That is, according to the present invention, provided are reference image storage means for storing a predetermined reference image, change amount detection means for obtaining a difference with respect to the reference image to detect a change amount, motion amount detection means for detecting a motion amount with reference to the reference image, determination means for determining the change amount and the motion amount, compression encoding means for compression-encoding image data, and switch means for on/off controlling input to the compression encoding means in accordance with the result of determination by the determination means, and control is made such that in accordance with the change amount detection means or motion amount detection means, an image frame with a small change amount and motion amount with respect to the reference image is not compression-encoded.

Further, recording means for recording input image data at predetermined time intervals or recording means for recording compressed image data compression-encoded by the above method is provided, and the speed of outputting compressed image data encoded by the compression encoding can be controlled by controlling reading from the recording means.

As it is apparent from the detailed description as above, the image data compression or expansion method and apparatus, and image transmission system and monitoring system using the method and apparatus, performs compression encoding and transmission such that the frame rate is low in a scene with small change amount and motion amount, while the frame rate is high in a scene with large change amount or motion amount. Accordingly, especially in a monitoring system or the like, which requires transmission of an image with a large motion amount with high image quality, high-speed transmission with high image quality and efficient recording, centering on such necessary image, can be realized. Further, when the transmitted and recorded image data is decoded and monitored, the image of a significant portion with a large change amount or motion amount can be quickly monitored with high image quality.

As many apparently widely different embodiments of the present invention can be made without departing from the spirit and scope thereof, it is to be understood that the invention is not limited to the specific embodiments thereof except as defined in the appended claims.

What is claimed is:

1. An image data compression apparatus which compresses input image data and outputs compressed image data, comprising:

compression processing means for compression-processing input image data;

image change detection means for detecting a change in an image based on the input image data;

frame rate control means for controlling a frame rate of outputted compressed image data obtained by compression-processing image data; and means for controlling the frame rate of outputted compressed image data such that the frame rate in a scene where the image change is small is lower than the frame rate in a scene where the image change is large, in accordance with the situation of the change in the image detected by the image change detection means;

wherein the frame rate control means includes switching control means for performing or not performing compression encoding on image data in one-frame units; and wherein the frame rate control means does not perform compression encoding on image data having a small change amount or a small motion amount, by using the switching control means, in accordance with a result of detection by change amount detection means or a result of detection by motion amount detection means.

2. An image-data compression apparatus according to claim 1, further comprising synthesizing means for synthesizing information on the frame rate of the compressed image data, controlled by the frame rate control means;

wherein the information on the frame rate is added to the compressed image data, and the compressed image data is outputted.

3. An image data compression apparatus according to claim 2, wherein the information on the frame rate is information on a number of frames thinned out for reducing the frame rate or information on a time interval between thinned frames.

4. An image data compression method for compressing input image data and outputting compressed image data, comprising the steps of:

compression-processing input image data;

detecting a change in an image based on the input image data;

controlling a frame rate of outputted compressed image data obtained by compression-processing image data such that the frame rate in a scene where the image change is small is lower than the frame rate in a scene where the image change is large, in accordance with the situation of the detected change in the image;

performing or not performing compression encoding on image data in one-frame units; and outputting the compression-processed image data;

wherein compression encoding is not performed on image data having a small change amount or a small motion amount in accordance with a result of detection by change amount detection means or a result of detection by motion amount detection means.

5. An image data compression method according to claim 4, further comprising the step of synthesizing information on the frame rate of the compressed image data, controlled in the frame rate controlling step;

wherein the information on the frame rate is added to the compressed image data, and the compressed image data is outputted.

6. An image data compression method according to claim 5, wherein the information on the frame rate is information on a number of frames thinned out for reducing the frame rate or information on a time interval between thinned frames.

* * * * *